No. 891,287. PATENTED JUNE 23, 1908.
J. G. PAUL.
FEED ROLL FOR WOODWORKING MACHINES.
APPLICATION FILED AUG. 23, 1907.
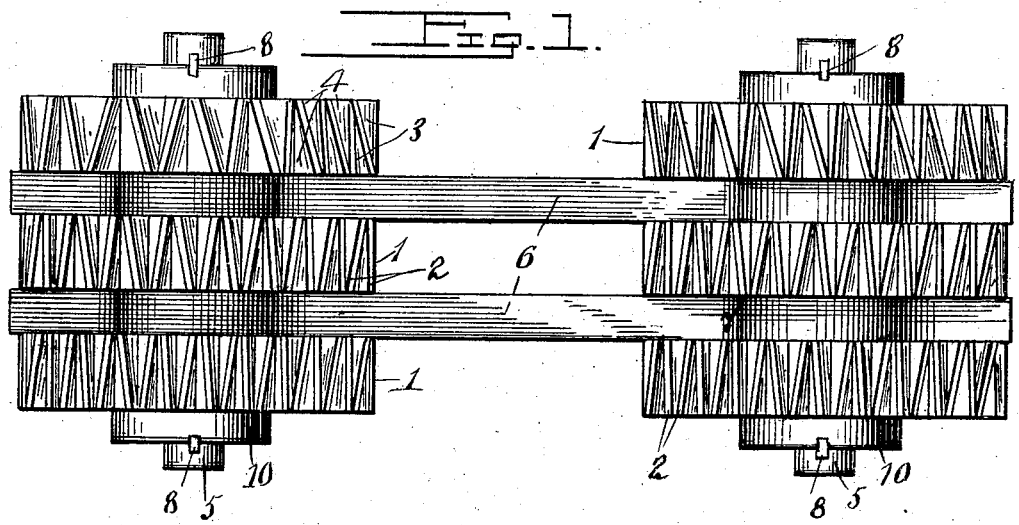
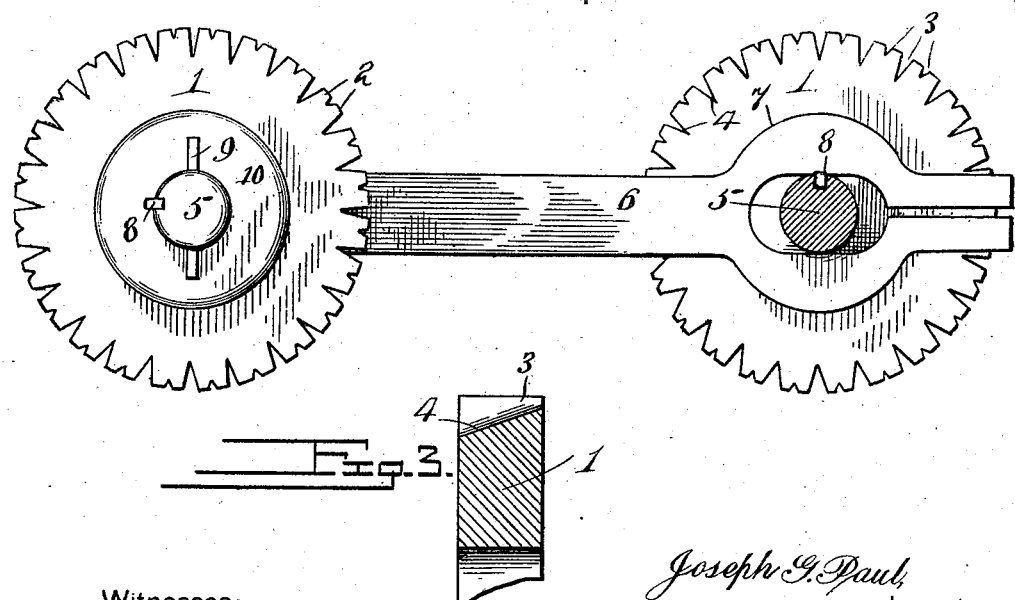
Witnesses:
Joseph G. Paul,
Inventor,
By Marion & Marion
Attorneys

UNITED STATES PATENT OFFICE.

JOSEPH GEORGE PAUL, OF MIDLAND, ONTARIO, CANADA.

FEED-ROLL FOR WOODWORKING-MACHINES.

No. 891,287.      Specification of Letters Patent.      Patented June 23, 1908.

Application filed August 23, 1907. Serial No. 389,772.

*To all whom it may concern:*

Be it known that I, JOSEPH GEORGE PAUL, a subject of the King of Great Britain, residing at Midland, county of Simcoe, in the Province of Ontario, Canada, have invented certain new and useful Improvements in Feed-Rolls for Woodworking-Machines; and I do hereby declare that the following is a full, clear, and exact description of the invention, such as will enable others skilled in the art to which it appertains to make and use the same.

My invention relates to feed rolls for wood working machines.

The object of my invention is to provide a feeding device for wood working machines, which will readily free itself and the material operated on from snow, ice, dirt, and other adhering matter.

My invention consists of the construction, combination and arrangement of parts, as herein illustrated, described and claimed.

In the accompanying drawings, forming part of this application, I have illustrated one form of embodiment of my invention, in which drawings similar reference characters designate corresponding parts, and in which:

Figure 1 is a plan view showing the application of my invention to the upper feed roll shafts of a wood working machine; Fig. 2 is a side elevation showing the outside feed roll at one end removed; and, Fig. 3 is a vertical section through the upper half of a feed roll, taken longitudinally of its axis.

Referring to the drawings, 1 designates as a whole a circular feed roll. The periphery of the roll 1 is provided with oblique teeth 2 inclined to produce oppositely directed channels. The space between the teeth 2 is milled out in a V-shape of increasing width from one side to the other of the roll, and of increasing depth, so as to leave inclined channels 4 which alternately open at their deeper ends on alternate sides of the roll.

A plurality of rolls 1 are disposed on each of the upper feed roll shafts 5, of a planer, saw, molding machine, or other wood working apparatus. Connecting bars 6 are disposed on the shafts 5, so that the rolls 1 are spaced apart, and between the rolls 1, the bars 6 are provided with rounded portions.

In the operation of the invention, as the lumber operated upon passes on or under the rolls 1, any adhering matter will be ground by the oblique teeth 2, so that it will leave the lumber and pass into the V-shaped spaces 3 between the teeth 2, and will be conducted by the channels 4 outside of the plane of the sides of the roller. As such adhering matter drops from the sides of the roll, it will fall on the rounded portions 7 of the connecting bar 6, and from thence will be dislodgde in the operation of the machine.

The rolls 1 will be retained on the shafts 5 by any common means such as by keys 8 and pins 9, a suitable washer 10 being placed between the keys 9 and the sides of the outside rolls 1.

Having thus fully described my invention, what I claim as new, and desire to secure by Letters Patent, is:—

1. A feed roll comprising a circular body having teeth with channels between the teeth of gradually increasing size from one side to the other of the roll.

2. A feed roll comprising a circular body having teeth with channels between the teeth of gradually increasing size from one side to the other of the roll, said channels being alternately oppositely directed.

3. A feeding device comprising shafts, bars secured on the shafts, and feed rolls provided with teeth having inclined channels opening alternately on opposite sides and disposed on the shafts on each side of the bar.

In witness whereof I have hereunto set my hand in the presence of two witnesses.

JOSEPH GEORGE PAUL.

Witnesses:
    EDITH BATTRICK,
    WM. FINLAYSON.